Patented Nov. 7, 1944

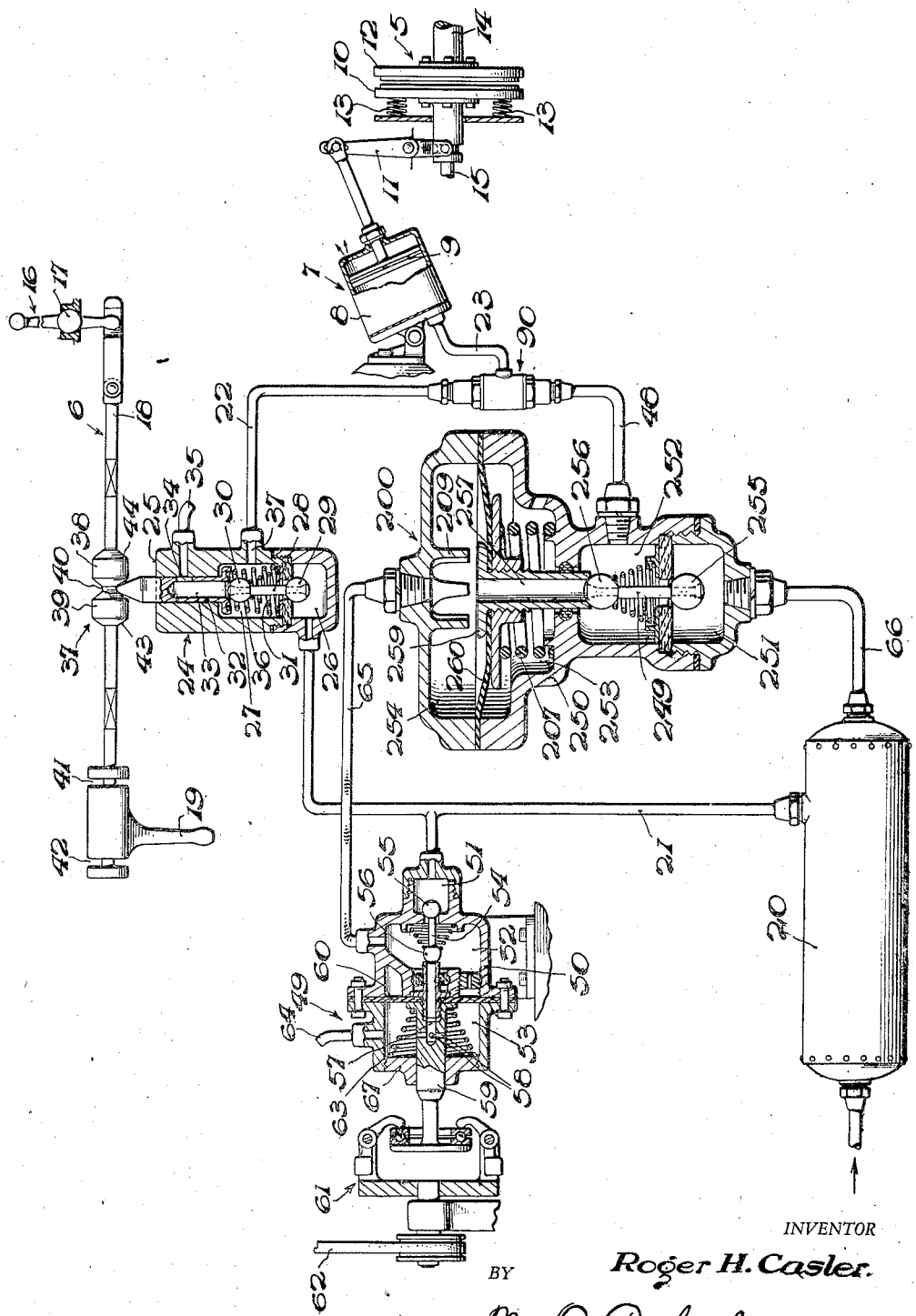

2,362,242

UNITED STATES PATENT OFFICE 2,362,242

CLUTCH CONTROL MECHANISM

Roger H. Casler, Elyria, Ohio, assignor to Bendix-Westinghouse Automotive Air Brake Company, Elyria, Ohio, a corporation of Delaware Application December 28, 1942, Serial No. 470,409

12 Claims. (Cl. 192—91)

This invention relates to motor vehicle clutch-controlling mechanism, and more particularly to a control device for coordinately controlling the operation of such a mechanism with other vehicle controls, such as the gear shifting apparatus.

It is accordingly one of the objects of this invention to provide a novel clutch-controlling mechanism which shall be operable to efficiently disengage the clutch and permit a graduated and smooth reengagement thereof.

Another object is to provide a novel and simplified arrangement for controlling the operation of a power device for a vehicle clutch, such arrangement securing a finely graduated control of the power device during increase in engine speed above a predetermined idling speed, whereby the clutch engagement may be smoothly effected.

Still another object is to provide a novel construction to insure complete disengagement of the clutch plates when the motor is idling.

Another object of the invention is to provide a novel power-operated clutch-controlling mechanism dependent upon the speed of operation of the vehicle engine and utilizing a simplified type of valvular mechanism for insuring full and complete energization of the clutch-operating power device when the engine speed drops to a predetermined value.

A further object is to provide, in a clutch-controlling mechanism of the foregoing type, a novel arrangement wherein the degree of energization of the clutch-operating power device may be rapidly decreased to a value such that the vehicle clutch is slightly engaged, such decrease in energization being governed by a relatively slight increase in engine speed.

A still further object is to provide, in such an arrangement, a construction wherein further decrease in energization of the clutch-operating power device beyond the point of slight initial engagement is governed wholly by additional increase in engine speed, whereby, as the vehicle engine speeds up, the vehicle clutch is smoothly and efficiently engaged.

A final object is to provide a novel and relatively simple mechanism for securing the above mentioned desirable results and advantages, and one which is so constructed and arranged as to be capable of ready adaptability to vehicles now in use.

Other objects and novel features of the invention will appear more fully hereinafter from the following detailed description when taken in connection with the accompanying drawing wherein one form of the invention is illustrated.

The drawing illustrates a diagrammatic view, partly in section, of a combined gear shifting and clutch controlling mechanism constructed in accordance with the principles of this invention.

Referring to the drawing there is disclosed therein a motor vehicle clutch controlling mechanism constructed in accordance with the principles of this invention, the same embodying a clutch 5, gear shifter control mechanism 6, and an arrangement for controlling the clutch in accordance with changes in engine speed as well as upon operation of the gear shifting mechanism, as will be more particularly described hereinafter.

Power means are provided for causing disengagement of the vehicle clutch and for initiating engagement thereof, including a fluid pressure operated motor 7 having relatively movable cylinder and piston elements 8 and 9. The latter is connected to a movable member 10 of the clutch through a suitable linkage 11, the construction being such that, with the piston 9 in the position shown, clutch member 10 is moved out of engagement with respect to clutch member 12, clutch control springs 13 being compressed. Upon deenergization of motor 7, clutch control springs 13 are effective to move clutch member 10 into engagement with clutch member 12 in order to effect a driving connection between the driving and driven shafts 14 and 15 respectively.

In order to effect automatic operation of the clutch 5 in accordance with the movements of the gear shift control mechanism, means are associated with the latter for coordinately controlling the energization of the fluid motor 7. As shown, such means include a conventional gear shift lever 16 which may be pivotally mounted at 17 and movable about such pivot to engage a shifter bar 18, controlling the second and third gear ratios. Such lever may also be moved to engage and shift a shifter bar, not shown, which controls the first and reverse gear ratios. Any suitable mechanism such as fork 19 may be employed for connecting the shifter bar 18 to the transmission gears. The motor 7 may be energized or charged with fluid pressure from a reservoir 20, through conduits 21, 22 and 23, a valve 24 being associated with the shifter bar 18 for controlling the energization and deenergization of the motor as the bar is shifted from one gear position to another.

More particularly valve 24 includes a casing 25 having an inlet chamber 26 and an outlet chamber 27, the said chambers respectively communicating with conduits 21 and 22. A stem 28 carrying intake and exhaust valves 29 and 30 is normally positioned, as by a spring 31, to close communication between chambers 26 and 27. In such position a valve actuating plunger 32, having a bore 33 communicating through a port 34 with an atmospheric connection 35, is normally maintained by spring 36 to connect chamber 27 with the connection 35. It will be understood that with the valves 29 and 30 occupying the aforementioned normal positions, that the motor 7 is exhausted and hence the clutch 5 engaged. However, in the event plunger 32 is moved downwardly, it will be seen that communication between chamber 27 and the atmosphere will be interrupted as soon as the lower portion of the plunger engages valve 30. Continued downward movement of the plunger will thereupon open valve 29 and establish communication between conduits 21 and 22 in order to charge the motor 7 with fluid pressure and cause clutch disengagement.

For the purpose of controlling the operation of the valve plunger 32 in accordance with gear changing movements of the shifter bar 18, the latter is provided with a cam mechanism 37 formed with a pair of similar cams 38 and 39 separated by a cam groove 40. In the position illustrated, the shifter bar 18 is in neutral and the spring 36 urges the plunger 32 into the groove 40. However, upon movement of the bar 18 in either direction from neutral to establish second or third gears, it will be understood that cams 38 or 39 will move the plunger 32 downwardly to effect disengagement of the clutch 5 as heretofore stated. Preferably lost motion connections 41 and 42 are employed between bar 18 and fork 19 in order that the clutch may be disengaged prior to the shifting of the gears. Cam mechanism 37 is also provided with cam portions 43 and 44 which permit the plunger 32 to be moved upwardly to exhaust the motor 7 to allow clutch engagement after the gear ratio has been established.

The present invention, in addition to providing means for controlling the energization of the clutch motor in accordance with movements of the gear shifting mechanism, also includes mechanism for energizing the clutch motor when the speed of the vehicle engine has reached a predetermined low idling speed. Such mechanism is also used for controlling the deenergization of the clutch motor and the construction is such that such deenergization will take place in a manner to secure a finely graduated and efficient engagement of the clutch, thereby eliminating jerky movement of the vehicle after a desired gear relation has been effected. As shown, the mechanism includes a valve device 49 constructed in a manner similar to that disclosed in the patent to Roy S. Sanford No. 2,228,612 dated January 14, 1941. More particularly, such valve mechanism includes a housing 50, having inlet, outlet and exhaust chambers 51, 52 and 53 respectively. A valve 54 having interconnected intake and exhaust portions 55 and 56, respectively, positioned in chambers 51 and 52 is provided for controlling the flow of fluid pressure. Intake portion 55, when open, establishes communication between chamber 52 and chamber 51. Valve 56 when open, serves to connect chambers 52 and 53, by way of port 57 and openings 58 formed in a valve operating member 59. The latter is secured to a diaphragm 60 and is capable of longitudinal shifting movement through the action of a suitable centrifugally operable device 61, drivably connected through a belt 62 to any movable part of the engine which is proportional to the engine speed. Upon increase in engine speed, mechanism 61 tends to move member 59 to the left against the tension of a spring 63. Thus, upon increase of engine speed, valve operating member 59 will move away from exhaust valve portion 56 to connect the outlet chamber 52 with the exhaust chamber 53, the latter communicating with the atmosphere through a conduit 64. At engine idling speed, however, the tension of spring 63 is so adjusted as to cause member 59 to contact the exhaust valve portion 56, thus opening intake valve portion 55 and connecting chambers 51 and 52. The latter is in constant communication with a conduit 65, while the former is in constant communication with the conduit 21.

In certain types of clutches utilized in present day practice, it has been found that a relatively high mechanical friction loss exists which must be overcome before the clutch springs are compressed to secure disengagement of the clutch. With the clutch disengaged, the force necessary to overcome such mechanical friction loss must be relieved before the clutch starts to reengage. If the centrifugally-controlled valve device 49 described above were to graduate the release of not only the pressure required to overcome friction loss but also the pressure required to overcome the energy of the clutch return springs, the engagement of the clutch may not be as gradual and smooth as may be desired, especially if the clutch has a high mechanical friction loss compared to the force necessary to engage the clutch through the compression of the clutch return springs.

The present invention, accordingly, contemplates a construction wherein the action of the centrifugally controlled mechanism upon valve 49 serves only to regulate the deenergization of the clutch motor after the latter has been deenergized to an extent substantially proportional to the force required to overcome the mechanical friction loss of the clutch.

In order to accomplish the foregoing, the valve device 49 is so adjusted that, when the engine is idling, the valve device will hold within the chamber 52 a fluid pressure corresponding substantially to that required in the clutch motor to hold the relatively movable members of the clutch 5 in very slight engagement. This is accomplished by adjusting a member 67 which varies the tension of spring 63. Under these conditions, the valvular device 49 operates as a pressure-reducing valve and exhausts all fluid pressure in excess of the amount just indicated.

From the foregoing, it will, therefore, be readily understood that, as the motor speed decreases, and valve 55 opens, fluid pressure will be conducted to the chamber 52 from the reservoir by way of conduit 21. Such pressure will rise to the value above stated and any excess of pressure will be exhausted past valve 56 due to the preset condition of spring 63. Such fluid pressure in chamber 52 is employed in accordance with the present invention to control a relay valve which in turn may connect the reservoir 20 with the clutch motor 7 in order to supply full reservoir pressure to the latter to insure prompt disengagement of the clutch. The construction is also such that, as the valve device 49 operates in accordance with increase in engine speed, such relay valve functions to control the exhaust of fluid pressure from the motor in a two-stage action, the first stage being a prompt release of pressure in the fluid motor to a value determined by the preconditioning of the valve device 49, where the plates of the clutch are in slight engagement and thereafter a graduated release of the remaining fluid pressure in the clutch motor in order to achieve a smooth and graduated engagement of the clutch. As shown, a two-stage relay valve 200 is operatively connected to said valve device 49 by conduit 65, and to clutch motor 7 by conduit 48, double check valve 90, having a free floating valve element, not shown, and conduit 23, and to pressure reservoir 20 by means of conduit 66. More particularly, such valve mechanism includes a housing 250 having inlet, outlet, intermediate and exhaust chambers 251, 252, 253 and 254 respectively. A valve 249 having interconnected intake and exhaust portions 255 and 256 respectively positioned in chambers 251 and 252 is provided to control the flow of fluid pressure to the valve device 200 through conduit 66. Intake portion 255 when open, establishes communication between chambers 251 and 252. Valve 256 when open, serves to connect chambers 252 and 254, by way of port 257 formed in a valve operating member 259, the latter being secured to a diaphragm 260.

Valve operating member 259 and diaphragm 260 are normally forced into their extreme upward positions to contact downwardly extending projections 209 in chamber 254, by means of spring 207. Fluid pressure from the centrifugal valve 49 is initially conducted directly to the clutch motor past normally open valve 256. As the pressure of the fluid in chamber 254 increases to the predetermined value, as governed by the setting of valve device 49, such pressure acts to depress the diaphragm 260 against the action of the spring 207 to first close the exhaust valve 256 and subsequently open intake valve 255, thereby admitting reservoir pressure directly to the clutch motor, thus insuring complete disengagement of the clutch plates whenever the motor is idling and centrifugal valve 49 is delivering its maximum pressure. The relay valve spring 207 is so adjusted in relation to the area of the diaphragm that a very slight decrease in the output pressure of the centrifugal valve upon speeding up of the vehicle motor to start the vehicle will result in an immediate drop in pressure in the clutch cylinder from the reservoir pressure to the pressure for which the centrifugal valve is adjusted, said pessure being just sufficient to cause a slight engagement of the clutch surfaces 10 and 12 as heretofore described. It will be apparent that upon decrease in pressure in chamber 254 of the two stage relay valve, spring 207 will force valve actuating member 259 upwardly, thereby first closing intake valve 255, and later opening exhaust valve 256. Thus clutch motor 7 is disconnected from conduit 66 and reservoir 20, and the pressure therein is promptly reduced to the pressure maintained in chamber 52 of valve device 49 by spring 63, through conduit 23, check valve 90, conduit 48, chamber 252, bore 257, chamber 254, conduit 65 and chamber 52.

Following the above reduction in pressure of the fluid in the clutch motor, it will be understood that as the engine speed increases, the remaining pressure of the fluid conducted to chamber 52 from the clutch motor will be gradually exhausted in accordance with engine speed. In this manner, smooth engagement of the clutch is secured through graduated exhaust of the energizing pressure of the clutch motor through the centrifugal valve.

In order to more clearly define the operation of the clutch controlling mechanism, assume that the vehicle has its engine idling as illustrated in the drawing. Under these circumstances, the valve device 49 will allow fluid pressure from reservoir 20 to enter chamber 52 wherein the reservoir pressure is reduced to an amount just sufficient to cause slight engagement of the clutch faces upon being transmitted to the fluid motor 7. However, this same reduced pressure is also sufficient, when acting on diaphragm 260 to overcome spring 207, whereupon the pressure from chamber 52 is cut off from motor 7, and full reservoir pressure is transmitted to said motor. It will be noted that reservoir pressure, passing though conduit 66, valve 255, conduits 48 and 23, will force the free floating valve element of double check valve 90 into such position as to interrupt communication between conduits 23 and 22. Thus, whenever the vehicle engine is idling, full reservoir pressure enters motor 7 and the clutch faces will be disengaged, making it possible for the transmission to be placed in low gear. Upon selecting low gear and accelerating the vehicle engine, fluid pressure from motor 7 is immediately reduced to the pressure maintained in chamber 52, and is thereafter gradually reduced through action of the centrifugal mechanism 61 to attain smooth engagement of the clutch surfaces.

In selecting second gear ratio, the shifter bar 18 is brought into operation, thereby causing full reservoir pressure to pass through conduit 21, valve device 24, conduit 22, double check valve 90, and conduit 23, into motor 7 to disengage the clutch. It will be understood that this pressure, in passing through double check valve 90, will force the free floating valve element thereof into such position as to disconnect conduits 48 and 23. As soon as the gear selector fork 19 has completed engagement of second gear, the valve 24 is allowed by cam mechanism 37, to extend outwardly, to cut off connection between conduits 21 and 22 and exhaust pressure from motor 7 as heretofore explained. Shifter bar 18 is likewise utilized to control the admission of reservoir pressure and its exhaust from motor 7, upon selection of third speed in a similar manner to that discussed in connection with selection of second speed. It is to be expressly understood, however, that so long as shifter bar 18 is not operated, that the admission of pressure to, and exhaust of pressure from motor 7 is controlled wholly by the joint operation of relay valve 200 and centrifugal valve mechanism 49, as previously explained to secure smooth engagement of the clutch faces.

There has been provided by the present disclosure, two methods for allowing fluid pressure to enter and be exhausted from the clutch operating motor. It has been found in practice that the system as shown and described, in which a finely graduated and smooth engagement of the clutch surfaces in a highly desirable manner is secured upon initially starting of the vehicle in low or reverse gear and in which the clutch actuation is more rapid upon shifting into second or third gear after the vehicle is in motion, is highly satisfactory. However, in the event that it should become desirable to secure a finely graduated engagement of the clutch surfaces upon shifting into second or third speeds as when shifting into low or reverse speeds, this could easily be done by merely eliminating the valve mechanism operated by the shifter bar. Such a modification, it will be understood, could be accomplished without altering the scope of the invention.

While only one embodiment of the invention has been illustrated and described with considerable particularity, it will be understood that various modifications may be resorted to without departing from the spirit of the invention, as will be understood by those skilled in the art. Reference will, therefore, be had to the appended claims for a definition of the limits of the invention.

What is claimed is:

1. The combination with an automotive vehicle having an engine and clutch, of a fluid motor for controlling engaging and disengaging operation of the clutch, means for controlling the energization and deenergization of said motor including a reservoir of fluid pressure, valve means responsive to engine speed for supplying fluid pressure from the reservoir to the motor, a connection between said valve means and motor, and means including a relay valve associated with said connection and controlled by the pressure supplied by the valve means for directly connecting the valve means and motor when said pressure is less than a predetermined value and for directly connecting said reservoir and motor when said pressure exceeds said predetermined value.

2. In combination with an automotive vehicle engine and clutch, of a power device connected to said clutch, control means for rendering the power device operative to disengage or permit engagement of the clutch, said control means including a centrifugally operated valve, a relay valve, means for connecting said valves, said relay valve being operative to cause substantially immediate disengagement of said clutch when the centrifugally operated valve moves to a predetermined position, said centrifugally operated valve including a portion automatically operative for checking the movement of the clutch as the latter reaches substantially the point of initial engagement, and thereafter controlling the movement of the clutch into operative engagement in accordance with the speed of the vehicle engine.

3. In combination with an automotive vehicle having an engine and a clutch, of a fluid pressure operated motor for controlling the disengaging and engaging movements of said clutch, means including a relay valve for energizing said motor to disengage the clutch, means for controlling the deenergization of said motor to cause clutch engagement comprising a valve responsive to engine speed connected with said relay valve, means for adjusting the speed responsive valve to effect a predetermined extent of deenergization of said motor upon initial increase in speed of the engine, and means to thereafter complete the deenergization of said motor to cause engagement of the clutch in accordance with further increase in engine speed.

4. In combination with an automotive vehicle engine and a clutch, of a power device connected to the clutch, and control means including a relay valve and centrifugal valve for rendering the power device operative to disengage and permit engagement of the clutch, said control means including a portion automatically operative for checking the movement of the clutch as the latter reaches substantially the point of initial engagement and for thereafter controlling the movement of the clutch into and out of operative engagement in accordance with the speed of the engine.

5. In an automotive vehicle provided with an internal combustion engine and a clutch, power means for operating the clutch to cause engagement and disengagement thereof, and means for controlling said power means for causing clutch disengaging operation thereof including a reservoir, a centrifugally operable valve and a second valve connected in series therewith between said reservoir and motor, and means including a member responsive to the pressure supplied by said centrifugal valve for operating said second valve for directly connecting the centrifugal valve and motor when said pressure is less than a predetermined value and for directly connecting said reservoir and motor when said pressure exceeds said predetermined value.

6. In combination with an automotive vehicle having an engine and a clutch, of a fluid motor for controlling engaging and disengaging operation of the clutch, means for controlling the ergerization and deenergization of said motor comprising a reservoir of fluid pressure, a relay valve adapted to connect said reservoir and motor to disengage the clutch, a valve operative in response to engine speed connected between said reservoir and relay valve, and means for operating said valves to secure substantially immediate energization of said motor, a predetermined partial deenergization of said motor and further complete deenergization of said motor in accordance with changes in engine speed.

7. In combination with an automotive vehicle having an engine and a clutch, of a fluid pressure operated motor for controlling the engaging and disengaging movements of said clutch, means including a relay valve for energizing said motor to disengage the clutch, means for controlling the deenergization of said motor to cause clutch engagement comprising a valve responsive to engine speed connected with said relay valve, means for adjusting said speed responsive valve to effect a predetermined extent of deenergization of said motor upon initial increase in speed of the engine, and centrifugal means controlled by engine speed for operating said last named valve to thereafter complete the deenergization of said motor to cause engagement of the clutch in accordance with further increase in engine speed.

8. In combination with an automotive vehicle engine and clutch, of a power device connected to said clutch, control means for rendering the power device operative to engage and disengage the clutch, said control means including a centrifugally operated valve, a relay valve controlled by said centrifugally operated valve, said relay valve being operative to cause substantially immediate disengagement of said clutch upon decrease of engine speed below a predetermined amount, said centrifugally operated valve including a portion automatically operative for checking the movement of the clutch as the latter reaches substantially the point of initial engagement upon increase of engine speed above said predetermined amount, and thereafter controlling the movement of the clutch into operative engagement in accordance with further increase in the speed of the vehicle engine.

9. In combination with an automotive vehicle engine and a clutch, of a fluid motor connected to said clutch, a reservoir of fluid pressure, control valves connecting said reservoir and motor for operating the latter to engage and disengage the clutch, said control valves comprising a speed responsive valve and a relay valve of such construction that the relay valve is controlled by the speed responsive valve, said relay valve including a portion adapted to admit a predetermined limited pressure to said motor from said speed responsive valve and a portion adapted to thereafter admit full reservoir pressure from said reservoir to said motor to disengage the clutch, and said speed responsive valve including a portion adapted to substantially immediately exhaust a predetermined amount of fluid pressure from said motor upon increase of engine speed above a predetermined speed and a portion adapted to thereafter gradually exhaust the remainder of said pressure from said motor in accordance with further increase in engine speed.

10. In combination with an automotive vehicle having an engine and a clutch, of a fluid motor for controlling engaging and disengaging operation of the clutch, and means for controlling the energization and deenergization of said motor comprising a reservoir of fluid pressure, a relay valve adapted to connect said reservoir and motor to disengage the clutch, and valve means controlled by engine speed for controlling the operation of the relay valve to first admit a predetermined limited pressure to said motor through one portion of said relay valve and then admit full reservoir pressure to said motor through a second portion of said relay valve upon decrease of engine speed below a predetermined speed, and to first exhaust a predetermined amount of fluid pressure from said motor upon increase of engine speed above said predetermined speed and to gradually exhaust the remainder of said pressure through said first portion of said relay valve in accordance with further increase of vehicle engine speed to secure smooth engaging operation of said clutch.

11. In an automotive vehicle provided with an internal combustion engine and a clutch, power means for operating the clutch to cause engagement and disengagement thereof, means for controlling said power means including a source of fluid pressure, a pair of valve devices connected in series between the source and said power means, means responsive to the speed of the engine for controlling the operation of one of said devices, and means including a member responsive to the pressure supplied by said one device for operating the other of said devices for directly connecting said one device and power means when said pressure is less than a predetermined value and for directly connecting said source and power means when said pressure exceeds said predetermined value.

12. In an automotive vehicle provided with an internal combustion engine and a clutch, power means for operating the clutch to cause engagement and disengagement thereof, means for controlling said power means including a source of power, a pair of power controlling devices connected in series between the source and said power means, means responsive to the speed of the engine for controlling the operation of one of said devices, and means including a member responsive to the power supplied by said one device for operating the other of said devices for directly connecting said one device and power means when the amount of power supplied by said one device is less than a predetermined value and for directly connecting said source and power means when the amount of said power supplied by said one device exceeds said predetermined value.

ROGER H. CASLER.